(12) United States Patent
Matusik et al.

(10) Patent No.: US 12,691,639 B1
(45) Date of Patent: Jul. 28, 2026

(54) MULTI-MATERIAL ADDITIVE FABRICATION WITH DIFFERENT APPLICATION-SPECIFIC PROPERTIES

(71) Applicant: Inkbit, LLC, Medford, MA (US)

(72) Inventors: Wojciech Matusik, Lexington, MA (US); Gregory Ellson, Boston, MA (US); Shai Elisha Almagor, Brookline, MA (US); Liam Schwartz, Danbury, CT (US)

(73) Assignee: Inkbit, LLC, Medford, MA (US)

( * ) Notice: Subject to any disclaimer, the term of this patent is extended or adjusted under 35 U.S.C. 154(b) by 434 days.

(21) Appl. No.: 18/130,086

(22) Filed: Apr. 3, 2023

Related U.S. Application Data

(60) Provisional application No. 63/362,399, filed on Apr. 2, 2022.

(51) Int. Cl.
| | |
|---|---|
| *B33Y 50/02* | (2015.01) |
| *B29C 64/343* | (2017.01) |
| *B33Y 10/00* | (2015.01) |
| *B33Y 80/00* | (2015.01) |

(52) U.S. Cl.
CPC ............ *B29C 64/343* (2017.08); *B33Y 10/00* (2014.12); *B33Y 50/02* (2014.12); *B33Y 80/00* (2014.12)

(58) Field of Classification Search
CPC .................................................... B33Y 50/02
See application file for complete search history.

(56) References Cited

U.S. PATENT DOCUMENTS

| | | | |
|---|---|---|---|
| 10,926,473 B1 | 2/2021 | Matusik et al. | |
| 11,072,125 B1 | 7/2021 | Weber et al. | |
| 11,186,033 B1 | 11/2021 | Berman et al. | |
| 2015/0366073 A1* | 12/2015 | Magdassi ................ | B22F 10/14 |
| | | | 264/494 |
| 2016/0101570 A1* | 4/2016 | Lorio .................... | B29C 64/393 |
| | | | 700/98 |
| 2017/0061036 A1* | 3/2017 | Schmidt .................. | G06F 30/20 |
| 2018/0197328 A1* | 7/2018 | He ............................ | G01J 3/44 |
| 2022/0072799 A1* | 3/2022 | Sultan ..................... | B29C 64/35 |

FOREIGN PATENT DOCUMENTS

CN          105625720 A   *   6/2016   ............. E04G 21/00

* cited by examiner

*Primary Examiner* — Suresh Suryawanshi
(74) *Attorney, Agent, or Firm* — Young Basile Hanlon & MacFarlane, P.C.

(57) ABSTRACT

An approach to multi-material additive fabrication incorporates application-specific surface and near-surface regions into a model used for control of fabrication, for example, using feedback controlled jetted fabrication.

24 Claims, 3 Drawing Sheets

MULTI-MATERIAL ADDITIVE FABRICATION WITH DIFFERENT APPLICATION-SPECIFIC PROPERTIES

CROSS-REFERENCE TO RELATED APPLICATIONS

This application claims the benefit of U.S. Provisional Application 63/362,399, filed Apr. 2, 2022, which is incorporated herein by reference.

BACKGROUND OF THE INVENTION

This invention relates to additive fabrication using multiple materials, and more particularly to use of multiple materials with different application-specific properties.

SUMMARY OF THE INVENTION

One or more broad aspects described relate to additive fabrication in which multiple materials are used to achieve application requirements. Preferably, the additive fabrication uses a layer-by-layer jetting approach with vision-based feedback, for instance as described in U.S. Pat. No. 10,252,466 "Systems and methods of machine vision assisted additive fabrication" and 10,456,984 "Adaptive material deposition for additive manufacturing". The cited patents and patent publications are incorporated herein by reference, and the techniques described may be used in combination with the approach described below.

Application-specific requirements of a fabricated object may include physical properties such as strength (e.g., shear and tensile strength), impact resistance, stiffness, flexibility, and/or pressure resistance (e.g., when forming a fluid channel). Generally, these physical properties characterize the form of the "bulk" of the object. On the other hand, other application specific properties may include surface properties, such as chemical resistance (e.g., to particular chemicals or classes of chemicals, such as acids), biocompatibility, heat resistance (e.g., requiring surface reflectance and/or insulation), UV filtering, and/or frictional characteristics.

One aspect, in general, includes pre-fabrication design (e.g., using CAD tools) of an object to be fabricated according to physical structure (i.e., receiving a solid model, for example, specifying a bounding surface of the object volume), as well as a received specification of a surface characteristic(s) of all or portions of the object's surface. As a particular example, the physical structure may define a fluidic device (e.g., a tube with internal mixing vanes), in which some surface portions of the device are intended to be in contact with a particular class of chemicals in operation and therefore are specified to have a certain surface characteristic or to be fabricated of specific materials. Prior to fabrication, a modified multi-material model is determined to include suitable surface material in the specified regions, for example, to a particular depth (i.e., a near-surface region of a fixed or specified depth, or a depth determined from the geometry of the object), and in some examples, incorporating interface structures to mechanically bond the surface material to the body material (e.g., as described in U.S. Pat. No. 11,186,033, titled "Material Interlocking"). This determination of the multi-material model may be user-mediated using a Computer-Aided Design (CAD) approach or may be fully automated using a computerized procedure.

Another aspect includes fabrication of the object. During such fabrication, multiple jets are used, each emitting different material during jetting passes. A controller uses the solid model that has incorporated the surface material specification, as well as fabrication feedback (e.g., vision-based feedback) to precisely fabricate the model. In general, during fabrication, there are at least three materials deposited: a support material surrounding the volume of the desired object (e.g., a wax), structural material for the bulk of the object (e.g., an epoxy), and a surface material (e.g., a specified polymer). As described in one or more of the incorporated patents, the materials solidify (or at least partially solidify) after each layer is deposited, for example, by phase change and/or polymerization mechanisms.

In some examples, the desired characteristics of the object characterized by the solid model not only specify surface properties, but also functionally specify structural properties of the bulk of the object. Such functional properties are used in some examples to automatically compute yet other multi-material structure of the bulk, including for example, gradation from one material to another (e.g., from a hard to a soft material), patterns of multiple materials (e.g., a printed "foam" structure), or incorporation of internal structural features (e.g., internal trusses) that achieve the specified structural properties. In combination with surface material specification, four or more materials may be utilized in the fabrication process.

Advantages of one or more aspects described above may include avoiding the need for post-fabrication coating of parts. Such post-fabrication coating may be difficult or impossible using conventional approaches, for example, if internal surfaces (e.g., inside fabricated fluid channels) must be coated. Furthermore, precise spatial variation of a coating may be achieved in a way that is not available in conventional coating approaches (e.g., increasing the thickness of a coating where increased wear is expected in operation). Another advantage is that coatings that may not naturally adhere to the structural material may be mechanically bonded using fabricated interlocking structures. Yet another advantage is that small-scale devices may be fabricated in this way (e.g., "micro-fluidic" devices) at a scale in which coating (e.g., with bio-compatible coatings) may today be impossible.

Other features and advantages of the invention are apparent from the following description, and from the claims.

DETAILED DESCRIPTION

Figure 1:
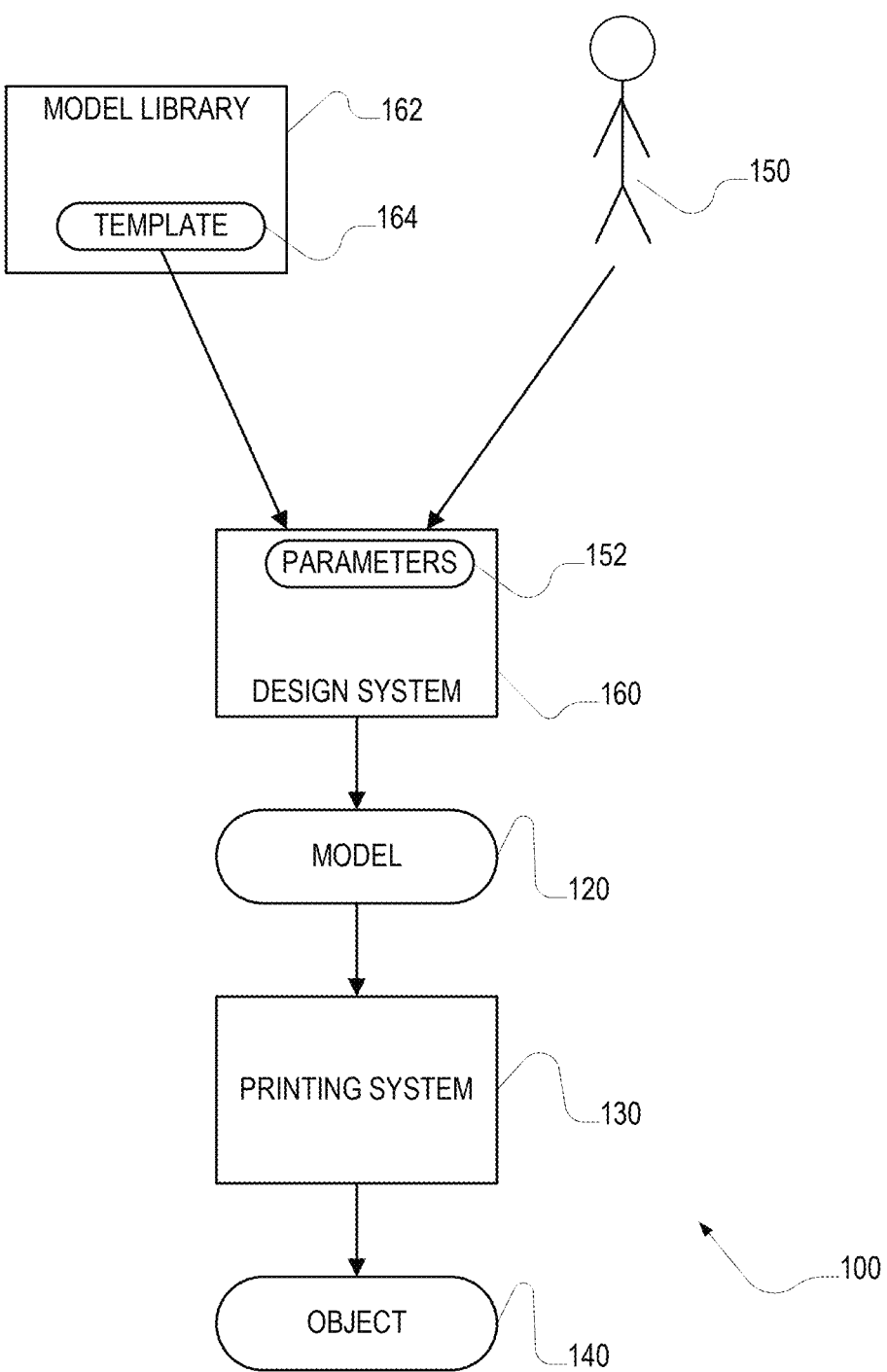
FIG. 1 is a system block diagram.

Referring to FIG. 1, a system 100 for additive fabrication uses a model 120 of an object 140 to be manufactured using a three-dimensional printing system 130. This model generally defines three-dimensional structures (e.g., shapes) and also specifies functional properties of the structures, for instance properties of the bulk of the structures, or properties of surfaces or material transitions in the object.

An example of such an object is a fluidic device. This device is define by functional properties for instance including one or more of (a) the shape of the volume through which the fluid will pass, (b) surface properties in regions where the fluid comes in contact with the device, (c) surface properties where the device is in contact with the external environment, (d) strength to support maximum pressure of the fluid, (e) operating temperature range, and (f) flexibility of the device, for example, providing sufficient rigidity or flexibility for a particular use.

Figure 2:
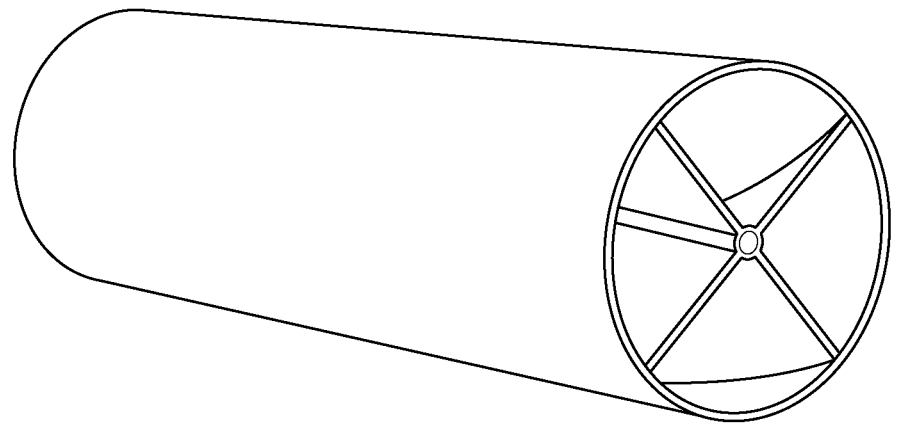
FIG. 2 is an isometric view of a multi-material static mixer made with chemically resistant epoxy.
Figure 3:
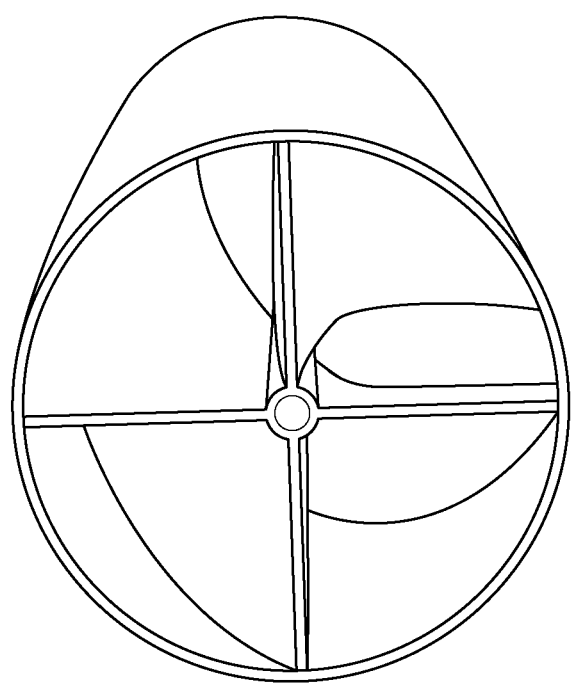
FIG. 3 is an end view of the multi-material static mixer of FIG. 2.
Figure 4:
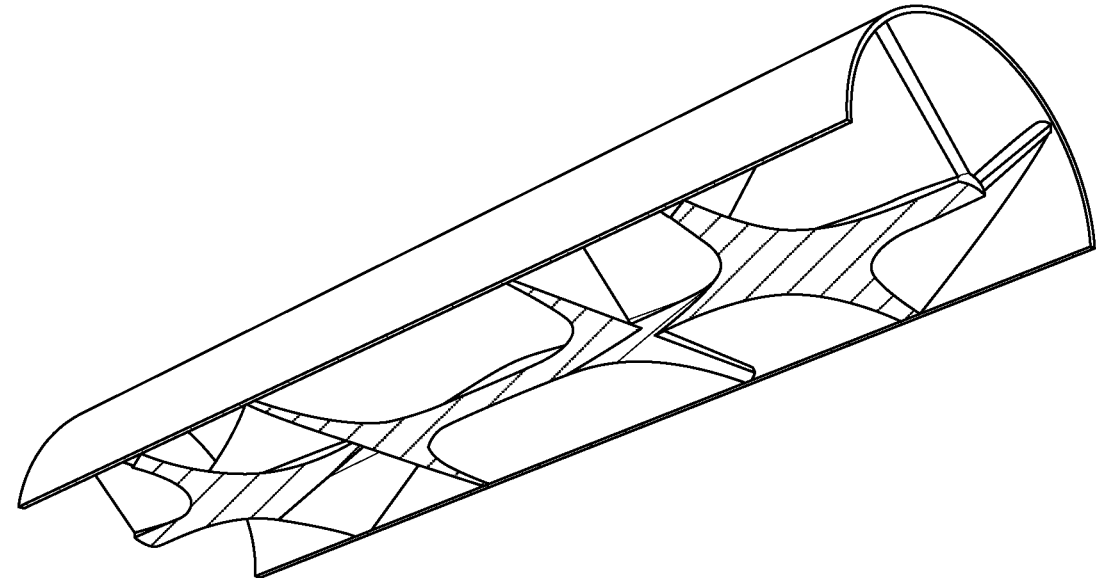
FIG. 4 is a cross-sectional view of the multi-material static mixer of FIG. 2.

An example of such a fluidic device is shown in FIG. 2. The device may be referred to as a "static mixer" 190. As illustrated in FIGS. 2-4, the device has a tube-like shape with internal vanes that cause mixing of the fluid as it passes through the device. Also as illustrated in FIGS. 2-4, the internal fluid surfaces of the device have a chemical-resistance coating.

Referring again to FIG. 1, the model 120 is used by a runtime printing system. While in some embodiments the object is fully specified, for example, according to a regular arrangement of rectangular voxels, with each voxel being specified in the model as being fabricated from a particular material, more generally, at least some aspects of the object are defined functionally, and the arrangement of material is determined during the printing processes.

In FIG. 1, a designer 150 uses a computer assisted design system 160 to form the model 120. For example, the design system 160 may have a library 162 of functional object templates 164 from which the designed may choose. In the case of the mixer 190, the library may have a generic structure that requires further specification, for example, according to parameters 152 provided by the designer to set the overall dimensions or alternatively flow requirements, fluid pressure capacity, surface coating material (e.g., at the fluid interfaces and/or the outer environmental surface), etc. For example, the coating material at the fluid boundaries of the device may provide acid resistance (e.g., a chemically resistant epoxy), and coating material at the external environmental interface may provide UV light resilience or impact resistance. In some examples, a surface region may provide desirable strength, heat tolerance, or thermal expansion properties, which may not be provided or required in a bulk region. For example, a surface may have a requisite heat tolerance or thermal expansion property while the bulk region may provide strength that may not be possible with the surface material. The designer provides this further specification, and the design system 160 uses it to modify the library template to form the model 120.

Certain aspects of the model are determined at design time. In this example, the specific shape of the fluid path, and the overall dimensions of the object may be defined in the model. Furthermore, the material (or materials) for the structural parts of the object may also be defined at this stage. Similarly, the minimum thickness and material choice of a coating material may be defined at the design stage. Furthermore, in some examples, the template may define a variation in coating thickness based on anticipated wear from the fluid flow, thereby providing greater thickness where the fluid flow may wear away the coating faster. Such an instance of the template may be considered to be a modified model of the object.

Other aspects of the model may be defined functionally in the model 120. For example, in order to provide sufficient adherence of the coating to the structural material, a functional definition of structure of the interface between the coating material and the structural material may be included in the model. For example, this functional definition may specify forms of interlocking structures, irregular boundaries to provide greater surface area, and the like. Another functional aspect may relate to the pressure capacity and rigidity or flexibility of the object. For example, the structural part may be defined according to a defined transition of the amount of open space (e.g., a foam or spiney structure) as a function of location within the structural part (e.g., as a function of distance from the fluids surface of the outside structural surface.

At runtime, the model 120 is processed by the printing system 130 shown in FIG. 1, for example, to incrementally compute a modified model as needed for the region of the object under fabrication. The printing system in this example is a jetted additive fabrication system in which successive layers of build material (e.g., the structural and coating materials) as well as support material (e.g., wax that is removed from the final device) are deposited in a vision feedback arrangement. In examples in which the model 120 does not include a full voxel based representation of the object, during fabrication the material to deposit at locations on the top surface of the partially-fabricated object are determined function. As an example, when determining the material for a part of the device within the coating thickness of the surface that will be in fluid contact, the printing system determines that the coating material is to be deposited at that location. When determining the material in a transition region beyond the coating thickness at the transition from the coating material to the structural material, the printing system may determine the material (e.g., coating vs structure) for cause interlocking to achieve the desired structures to be formed to cause the physical adherence of the material, for example, by definition in a coordinate system defined relative to the surface shape. In the bulk of the structural material, the degree of open spaces may be determined at runtime according to distances from the surfaces. Note that in this approach, storage for the model 120 does not have to be as large as would be required for a full voxel representation at the printer resolution. Furthermore, explicit voxel-based definition of the volume to be occupied by the coating material is not needed if the coating can be introduced as described above at runtime.

The design system 160 can include many different functional templates that may be composed to form an overall device or a set of devices that can be assembled after fabrication. For example, for a fluidic application, other elements may include values, such as pneumatically actuated fluid valves in which the device has fluid paths, pneumatic paths, and flexible elements that control fluid flow. Other domains of such functional templates can include mechanical structures (e.g., gears, motors, etc.) and electrical structures (e.g., in which circuit paths may be defined without explicit voxel-definition of the regions in which conductive material is to be deposited).

In some examples, the example static mixer described above can be formed using a chemically resistant coating material (or if such material has suitable structural properties, the entire device may be formed from that material). A suitable chemically resistant epoxy would preferably include the properties shown immediately below.

| MECHANICAL PROPERTIES | STANDARD | VALUE |
|---|---|---|
| Ultimate Tensile Strength | ASTM D638-IV | 59.2 MPa |
| Elongation at Break | ASTM D638-IV | 2.5% |
| Elastic Modulus | ASTM D638-IV | 2.7 GPa |
| Shore Hardness | ASTM D2240 | 81 D |
| Izod Impact (Notched) | ASTM D256 | |
| Flexural Strength | ASTM D790 | |
| Flexural Modulus | ASTM D790 | |

| THERMAL PROPERTIES | STANDARD | VALUE |
| --- | --- | --- |
| HDT @ 0.45 MPa | ASTM D648 | 130° C. |
| HDT @ 1.82 MPa | ASTM D648 | 116° C. |
| Glass Transition Temperature | ASTM D3418 | 131° C. |

| General PROPERTIES | STANDARD | VALUE |
| --- | --- | --- |
| Water Absorption | ASTM D570 | |
| Density | ASTM D792 | |

| DIELECTRIC PROPERTIES | STANDARD | VALUE |
| --- | --- | --- |
| Dielectric Constant | ASTM D150 | |
| Dielectric Factor | ASTM D150 | |

Solvent Compatibility

Percent weight gained after five days submersion at 25° C., following ASTM D543.

Testing carried out by an ASTM certified laboratory.

| Solvent | 5 Day Weight Gain (%) | 5 Day Size Gain (%) |
| --- | --- | --- |
| Isopropyl Alcohol | −0.07 | −0.05 |
| Acetone | 0.87 | 0.02 |
| Ethanol | 0.14 | 0.00 |
| Toluene | 0.15 | −0.02 |
| NaOH (10% w/w aq) | 0.30 | 0.02 |
| Bleach (10% w/w aq) | 0.56 | 0.00 |

The chemically resistant material is covered with a stronger and more resilient epoxy that is impact resistant. Suitable properties for this impact resistant epoxy are shown below.

| MECHANICAL PROPERTIES | STANDARD | VALUE |
| --- | --- | --- |
| Ultimate Tensile Strength | ASTM D638-IV | 53.8 MPa |
| Elongation at Break | ASTM D636-IV | 7.1% |
| Elastic Modulus | ASTM D638-IV | 2.5 GPa |
| Shore Hardness | ASTM D2240 | 78 D |
| Izod Impact (notched) | ASTM D256 | 33.8 J/m \| 3.31 kJ/m2 |
| Flexural Strength | ASTM D790 | |
| Flexural Modulus | ASTM D790 | |

| THERMAL PROPERTIES | STANDARD | VALUE |
| --- | --- | --- |
| HDT @ 0.45 MPa | ASTM D648 | 81° C. |
| HDT @ 1.82 MPa | ASTM D648 | NYT |
| Glass Transition Temperature | | 78-82° C. |

NYT - Not Yet Tested

| General PROPERTIES | STANDARD | VALUE |
| --- | --- | --- |
| Water Absorption | ASTM D570 | |
| Density | ASTM D792 | |
| Glass Transition Temperature | | |

| DIELECTRIC PROPERTIES | STANDARD | VALUE |
| --- | --- | --- |
| Dielectric Constant | ASTM D150 | |
| Dielectric Factor | ASTM D150 | |

ASTM 4459: Q-Sun XE-1, 0.8 $W/m^2$ at 420 nm, 55° C. ASTM D638: Type IV, 50 mm/min, average values represented.

The design system 150, and control elements of the printing system 130 may be implement in software, for example, using instructions stored on non-transitory machine-readable media such that when the instructions are executed by a processor (e.g., a general purpose computer of the design system, or an embedded controller of the printing system), the processor performs the operations described above.

Inventive aspects are itemized below:

A method additive fabrication comprises receiving a solid model of an object; receiving a specification of a surface characteristic of at least some of the surface of the object, wherein the surface characteristic comprises a chemical resistance characteristic; computing a modified model of the object, the modified model having a volume corresponding to the solid model and having a surface and near-surface region specified to be formed of a surface material and bulk regions specified to be formed from a bulk material; and providing the modified model for additive fabrication of the object.

The modified model is computed during fabrication of the object.

Computing the modified model is performed incrementally during the fabrication of the object.

The modified model comprises a functional specification.

A method additive fabrication comprising receiving a solid model of an object; receiving a specification of a surface characteristic of at least some of the surface of the object; computing a modified model of the object, the modified model having a volume corresponding to the solid model and having a surface and near-surface region specified to be formed of a surface material and bulk regions specified to be formed from a bulk material; and providing the modified model for additive fabrication of the object; wherein in the object comprises a fluid static mixer, and the surface of the object comprises an inner surface of the mixer to be in fluid contact during operational use of the mixer.

A method for fabricating a multi-material object, the method comprising receiving a model of an object, the model specifying surface and near-surface coating regions to be fabricated using a surface material and specifying a bulk region to be fabricated using a bulk material; and controlling jetted deposition of the surface material and the bulk material in a plurality of successive layers, at least some layers comprising both the surface material and the bulk material.

An object fabricated by additive fabrication, a modified model for the object being determined by a comprising: receiving a solid model of an object; receiving a specification of a surface characteristic of at least some of the surface of the object; computing a modified model of the object, the modified model having a volume corresponding to the solid model and having a surface and near-surface region specified to be formed of a surface material and bulk regions specified to be formed from a bulk material; and providing the modified model for additive fabrication of the object; and the object being fabricated by a comprising: receiving the modified model of the object, the modified model specifying surface and near-surface coating regions to be fabricated using a surface material and specifying a bulk region to be fabricated using a bulk material; and controlling jetted deposition of the surface material and the bulk material in a plurality of successive layers, at least some layers comprising both the surface material and the bulk material.

The object comprises a fluidic device having an inner surface that is in fluid contact during operational use, and wherein the chemical resistance characteristic is specified for the inner surface.

The bulk regions are specified in the modified model to provide pressure resistance sufficient to withstand a maximum operating pressure of a fluid flowing through the fluidic device.

The modified model includes a functional specification of the maximum operating pressure, and wherein the bulk regions are computed based at least in part on the specified maximum operating pressure.

The modified model specifies internal mechanical structures within the bulk regions to increase pressure resistance of the object.

The internal mechanical structures comprise internal truss structures, lattice structures, or foam-like structures fabricated within the bulk regions.

The internal mechanical structures comprise a spatial variation in material density within the bulk regions as a function of distance from the inner surface of the object.

The surface characteristic further comprises ultraviolet radiation resistance for an external surface of the object.

The modified model specifies an exterior surface and a near-surface region of the object to be formed of a UV-resistant surface material.

The modified model specifies different surface materials for an inner surface and for the external surface, the inner surface being specified to provide chemical resistance and the external surface being specified to provide UV resistance.

The surface material is mechanically integrated with an adjacent bulk material by interface structures fabricated during additive fabrication of the object.

The modified model specifies the interface structures between the surface material and the bulk material.

The interface structures comprise interlocking geometries that mechanically couple the surface material to the bulk material.

The interlocking geometries comprise non-planar or irregular boundaries between the surface material and the bulk material.

At least some additive layers comprise both the surface material and the bulk material such that the surface material is mechanically interpenetrated with the bulk material during fabrication.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method additive fabrication comprising:
receiving a solid model of an object;

receiving a specification of a surface characteristic of at least some of the surface of the object, wherein the surface characteristic comprises a chemical resistance characteristic;
computing a modified model of the object, the modified model having a volume corresponding to the solid model and having a surface and near-surface region specified to be formed of a surface material and bulk regions specified to be formed from a bulk material; and
providing the modified model for additive fabrication of the object.

2. The method of claim 1, wherein the modified model is computed during fabrication of the object.

3. The method of claim 2, wherein computing the modified model is performed incrementally during the fabrication of the object.

4. The method of claim 1, wherein the modified model comprises a functional specification.

5. A method additive fabrication comprising:
receiving a solid model of an object;
receiving a specification of a surface characteristic of at least some of the surface of the object;
computing a modified model of the object, the modified model having a volume corresponding to the solid model and having a surface and near-surface region specified to be formed of a surface material and bulk regions specified to be formed from a bulk material; and
providing the modified model for additive fabrication of the object;
wherein in the object comprises a fluid static mixer, and the surface of the object comprises an inner surface of the mixer to be in fluid contact during operational use of the mixer.

6. A method for fabricating a multi-material object, the method comprising:
receiving a model of an object, the model specifying surface and near-surface coating regions to be fabricated using a surface material and specifying a bulk region to be fabricated using a bulk material; and
controlling jetted deposition of the surface material and the bulk material in a plurality of successive layers, at least some layers comprising both the surface material and the bulk material.

7. An object fabricated by additive fabrication, a modified model for the object being determined by a method comprising:
receiving a solid model of an object;
receiving a specification of a surface characteristic of at least some of the surface of the object;
computing a modified model of the object, the modified model having a volume corresponding to the solid model and having a surface and near-surface region specified to be formed of a surface material and bulk regions specified to be formed from a bulk material; and
providing the modified model for additive fabrication of the object;
and the object being fabricated by a method comprising:
receiving the modified model of the object, the modified model specifying surface and near-surface coating regions to be fabricated using a surface material and specifying a bulk region to be fabricated using a bulk material; and controlling jetted deposition of the surface material and the bulk material in a plurality of successive layers, at least some layers comprising both the surface material and the bulk material.

8. The method of claim 1, wherein the object comprises a fluidic device having an inner surface that is in fluid contact during operational use, and wherein the chemical resistance characteristic is specified for the inner surface.

9. The method of claim 8, wherein the bulk regions are specified in the modified model to provide pressure resistance sufficient to withstand a maximum operating pressure of a fluid flowing through the fluidic device.

10. The method of claim 9, wherein the modified model includes a functional specification of the maximum operating pressure, and wherein the bulk regions are computed based at least in part on the specified maximum operating pressure.

11. The method of claim 9, wherein the modified model specifies internal mechanical structures within the bulk regions to increase pressure resistance of the object.

12. The method of claim 11, wherein the internal mechanical structures comprise internal truss structures, lattice structures, or foam-like structures fabricated within the bulk regions.

13. The method of claim 11, wherein the internal mechanical structures comprise a spatial variation in material density within the bulk regions as a function of distance from the inner surface of the object.

14. The method of claim 1, wherein the surface characteristic further comprises ultraviolet radiation resistance for an external surface of the object.

15. The method of claim 14, wherein the modified model specifies an exterior surface and a near-surface region of the object to be formed of a UV-resistant surface material.

16. The method of claim 15, wherein the modified model specifies different surface materials for an inner surface and for the external surface, the inner surface being specified to provide chemical resistance and the external surface being specified to provide UV resistance.

17. The method of claim 1, wherein the surface material is mechanically integrated with an adjacent bulk material by interface structures fabricated during additive fabrication of the object.

18. The method of claim 17, wherein the modified model specifies the interface structures between the surface material and the bulk material.

19. The method of claim 17, wherein the interface structures comprise interlocking geometries that mechanically couple the surface material to the bulk material.

20. The method of claim 19, wherein the interlocking geometries comprise non-planar or irregular boundaries between the surface material and the bulk material.

21. The method of claim 17, wherein at least some additive layers comprise both the surface material and the bulk material such that the surface material is mechanically interpenetrated with the bulk material during fabrication.

22. A method of additive fabrication comprising:
receiving a solid model of an object;
receiving a specification of a surface characteristic of at least some of the surface of the object, wherein the surface characteristic comprises a heat resistance characteristic;
computing a modified model of the object, the modified model having a volume corresponding to the solid model and having a surface and near-surface region specified to be formed of a surface material and bulk regions specified to be formed from a bulk material; and
providing the modified model for additive fabrication of the object.

23. The method of claim 22, wherein the bulk material provides greater mechanical strength than the surface material, and wherein the surface material provides greater heat resistance than the bulk material.

24. The method of claim 22, wherein the object comprises a fluidic device having an inner surface that is in fluid contact during operational use, and wherein the bulk material provides pressure resistance to withstand pressure of the fluid.

* * * * *